(12) United States Patent
Yeung et al.

(10) Patent No.: US 9,325,717 B1
(45) Date of Patent: Apr. 26, 2016

(54) WEB-STORE RESTRICTION OF EXTERNAL LIBRARIES

(71) Applicant: GOOGLE INC., Mountain View, CA (US)

(72) Inventors: Bryan Russell Yeung, Waterloo (CA); Peng Huang, Kitchener (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/856,815

(22) Filed: Sep. 17, 2015

Related U.S. Application Data (62) Division of application No. 13/541,381, filed on Jul. 3, 2012, now Pat. No. 9,178,746.

(51) Int. Cl.
  *G06F 13/00* (2006.01)
  *H04L 29/06* (2006.01)

(52) U.S. Cl.
  CPC .................... *H04L 63/101* (2013.01)

(58) Field of Classification Search
  CPC .............................. G06F 9/44521; G06F 9/547
  USPC ................................................. 719/311, 331
  See application file for complete search history.

(56) References Cited

U.S. PATENT DOCUMENTS

| | | | |
|---|---|---|---|
| 6,314,566 B1 | 11/2001 | Arrouye et al. | |
| 8,078,693 B2 | 12/2011 | Luk et al. | |
| 8,621,608 B2 * | 12/2013 | Dalcher | H04L 63/1425 709/217 |
| 2006/0010196 A1 * | 1/2006 | Laird | G06F 17/30873 709/203 |
| 2006/0206585 A1 | 9/2006 | Lubin et al. | |
| 2007/0136579 A1 * | 6/2007 | Levy | H04L 63/102 713/168 |
| 2013/0060885 A1 | 3/2013 | Fu et al. | |
| 2015/0249675 A1 | 9/2015 | Yeung et al. | |

OTHER PUBLICATIONS

Notice of Allowance for U.S. Appl. No. 13/541,381, mailed Jun. 19, 2015, 11 pages.
Restriction Requirement for U.S. Appl. No. 13/541,381, mailed Apr. 1, 2015, 6 pages.

* cited by examiner

*Primary Examiner* — Andy Ho
(74) *Attorney, Agent, or Firm* — Brake Hughes Bellermann LLP (57) ABSTRACT

A browser-based fetch of an external library may include a browser receiving a request from a web application to load an external library and determining whether the web browser has a bundled version of the library. If the bundled version exists, the browser may load the bundled version. If the bundled version does not exist, the browser may fetch the external library. When the external library is configured to send data to the remote server the method may include the browser intercepting a request to send the data to the remote server, determining that the data may be sent at a later time, and storing the data until a connection with the remote server is established. Additionally, a web store may inspect a web application for use of an external library and prevent the web application from being added to the web store when the external library is not trusted.

20 Claims, 5 Drawing Sheets

WEB-STORE RESTRICTION OF EXTERNAL LIBRARIES

RELATED APPLICATION

This application is a divisional of, and claims priority to U.S. patent application Ser. No. 13/541,381, filed Jul. 30, 2012, entitled "BROWSER-BASED FETCH OF EXTERNAL LIBRARIES," the disclosure of which is incorporated herein in its entirety.

TECHNICAL FIELD

This disclosure generally relates to browser control over fetching and executing external libraries used by a web application.

BACKGROUND

Browser-based applications, or web applications, are software applications designed to run in a web browser. Such applications are often available through a web store or digital marketplace and run in a specific browser. Sometimes third parties offer tools or utilities, often referred to as libraries, for web application developers to use in the web applications they create. For example, vendors or other third-party software developers may offer a library of web analytics tools or a library of video streaming tools for use in other web applications. Such third party, or external, libraries often provide functionality the developers could not duplicate on their own without great cost. These external libraries sometimes receive data collected at the browser used to provide some features. Additionally, the external libraries have traditionally been run from the remote server. Thus, a network connection is often required to successfully run the web application so that the client computer running the browser may communicate with the server hosting the library.

While these external libraries expand the functionality of web applications, use of such libraries has caused security issues. Because of this and other issues, some browsers may not allow a web application to execute external libraries themselves. Furthermore, such libraries are not available to a web application when running offline because the web application cannot reach the server that hosts the library. Thus, it would be desirable to guard against web applications that use malicious or untested libraries while still allowing applications to use approved libraries, whether online or offline.

SUMMARY

One aspect of the disclosure can be embodied in a computer-implemented method that includes inspecting a web application for requests to use external libraries and determining whether an identified external library is trusted. The method may include preventing the web application from being added to a web store when the identified external library is not trusted and allowing the web application to be added to the web store when the identified external library is trusted. In some implementations, determining whether the identified external library is trusted may include determining whether the identified external library is on a whitelist or a blacklist. In some implementations inspecting the web application for requests includes inspecting a manifest file associated with the web application and determining whether the manifest file includes an explicit declaration identifying the external library.

Another aspect of the disclosure can be embodied in a method executed by at least one processor performing operations for a web browser, the method being performed by the web browser. The method may include receiving a request from a web application to load an external library stored on a remote server, determining whether the web browser has a bundled version of the external library, and loading the bundled version when it is determined that the bundled version exists. In some implementations, the determining and loading may occur only when a locally cached version of the library does not exist. In such implementations the method may further include fetching the external library from the remote server when it is determined that the web browser does not have a bundled version of the external library and caching the external library in a memory associated with the web browser.

These and other aspects can include one or more of the following features. For example, the external library may be bundled with an update to the web browser and/or with the web application. The method may also include receiving an update to the external library at the web browser from the remote server and updating the bundled version when a bundled version exists. In some implementations the external library may be configured to send data to the remote server and the method further includes intercepting a request to send the data to the remote server, determining whether a connection with the server exists. When a connection does not exist, the method may include determining whether the data may be sent at a later time and storing the data until a connection with the remote server is established when the data may be sent at a later time. In some implementations receiving the request may include intercepting a load event for the external library and matching the load event to a pattern. In such implementations the determining and loading occur when the load event matches the pattern.

One aspect of the disclosure may be embodied in a computing device that includes a processor configured to execute a web browser initiated by an operating system of the computing device and a local storage device. The browser may be configured to receive a request from a web application to load an external library stored on a remote server, determine whether the web browser has a bundled version of the external library, and load the bundled version when it is determined that the bundled version exists.

Another aspect of the disclosure may be embodied in a non-transitory computer readable medium containing instructions executable as a web browser running on a processor. The instructions may cause the processor to receive a request from a web application to load an external library stored on a remote server, determine whether the web browser has a bundled version of the external library, and load the bundled version when it is determined that the bundled version exists.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Systems and methods described here allow for browser control of the use of external libraries in a web application. A web store may control the external libraries used by web applications that are offered through the web store and the browser may perform the fetching of the library resources at the time the web application runs. For example, when a web application is submitted to a web store or digital marketplace, the web store may inspect the web application to determine whether it requires an external library. If an external library is required, the web store may consult a whitelist or blacklist to determine whether the external library is allowed. If allowed, the web application may be accepted by the web store and made available to users. If not allowed, the web store may reject the web application.

When a web application loads an external library at runtime, the browser may intercept the load event if the event matches a pattern. For example, the browser may store the URLs of external libraries and, if the URL of the load event matches a stored URL, the browser may intercept the load event. In other implementations the web application may make a special load request directed to the browser. In either situation, the browser may fetch the external library for the web application rather than allowing the web application to fetch and execute the library. In so doing, the browser may take advantage of locally stored copies of the libraries to allow the web application to run even without a network connection and, during such unconnected runs, may batch data destined for a remote server associated with the external library until a network connection is established. In some implementations the web application running in conjunction with the external library may mark the data as either eligible for batching or not eligible, and the browser may only batch data flagged as eligible.

In addition, because the web application no longer runs the library at a remote server, updates to the library must be pushed. Thus, in some implementations the browser may receive updates for the libraries and apply the updates to its local copy. The local copy may be a cached copy or a bundled copy.

Figure 1:
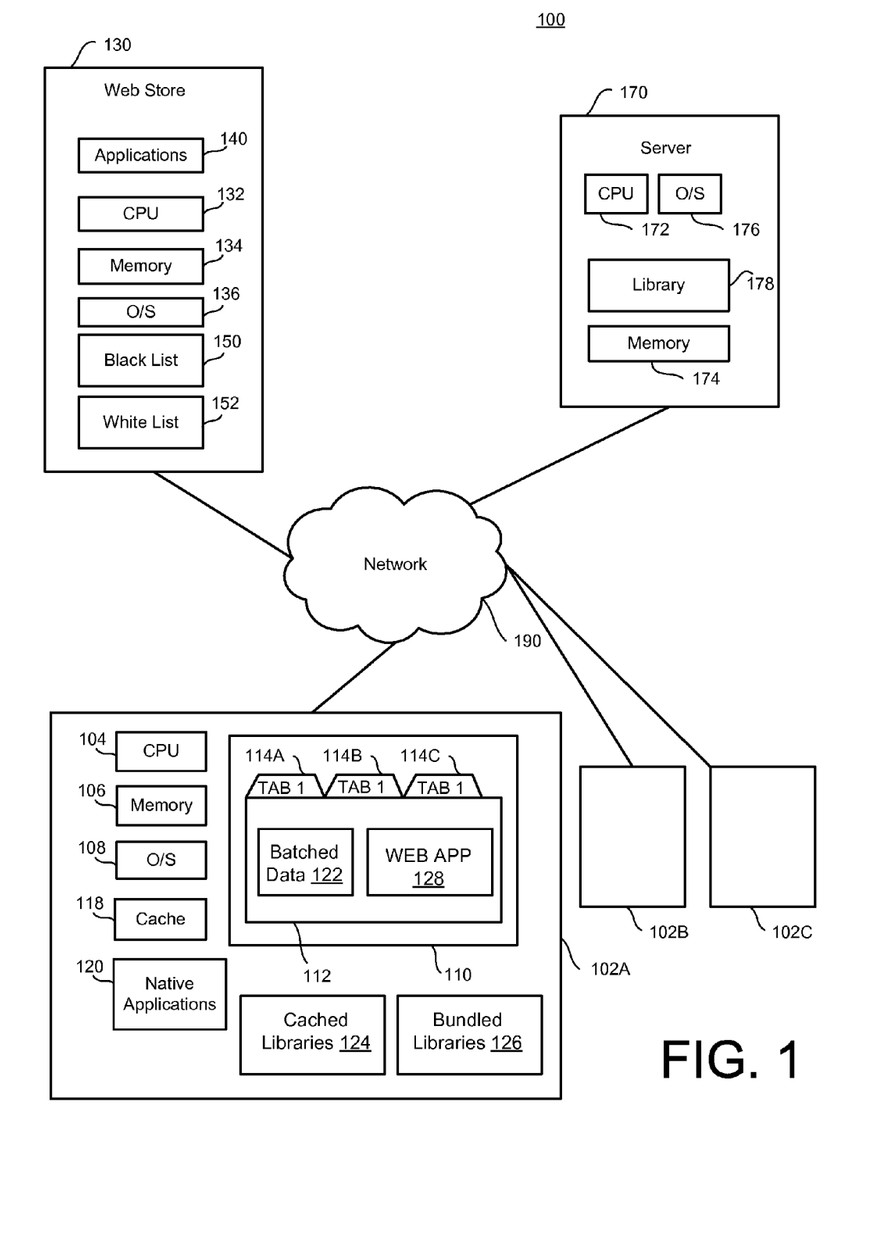
FIG. 1 is a schematic diagram of a system for browser control of external libraries used by web applications.

FIG. 1 is a schematic block diagram of an example implementation of a system 100 that may provide browser control of external libraries used by web applications. In various implementations, the system 100 may include client computing devices 102A, 102B, 102C (such as desktop computers, notebook computers, netbook computers, tablet computers, smart-phones, televisions with at least one processor, etc.). A client computing device 102A can include one or more processors (CPU) 104 and one or more memories 106. The client computing device 102A can execute an operating system (O/S) 108 and various applications (110, 120) which may display a user interface window (e.g., web browser 112). The client computing device 102A can include a cache 118 and one or more native applications 120. Application 110 is an example of a native application, and the user interface window of application 110 is a web browser 112. Other examples of native applications 120 include word processing applications, image editing applications, email applications, media players, calculators, etc.

In various implementations, the web browser 112 may include or be associated with one or more web applications 128. In this context, a "web application" may be configured to perform a single task or multiple tasks for a user. In such an implementation, the web application may be configured to be executed or interpreted by the web browser 112. This is compared with the native applications (e.g., native application 120) that include machine executable code and are configured to be executed directly by a processor or via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a native application 120. Examples of web applications include games, photo editors, and video players that are run inside the web browser 112.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In some implementations, browser 112 may sandbox web applications 128, so that web applications 128 cannot access the resources of computing device 102A or directly communicate with external servers, such as external server 170. Instead, browser 112 may control access to resources and external servers for web application 128.

In one implementation, the client computing device 102A may be running or causing the operating system 108 to execute application 110 or web browser 112. In various implementations, this web browser 112 may include a plurality of panes or tabs 114A, 114B, 114C. The web browser 112 can be a visual area, usually rectangular, containing some kind of user interface. In a graphical user interface (GUI) used in the client computing device 102A, the web browser 112 can be a two-dimensional object arranged on a plane of the GUI known as the desktop. The web browser 112 can include other graphical objects that may be called the "chrome" of the web browser, e.g., a menu-bar, toolbars, controls, icons. The web browser may also include a working area in which a document, image, folder contents, or other main object (e.g., web application 128) can be displayed. The working area may be capable of holding only one main object (i.e., in a single document interface) or more than one main object in a multiple document interface. In some applications, specifically web browsers, multiple documents can be displayed in individual tabs 114A, 114B, 114C. These tabs 114A, 114B, 114C are typically displayed one at a time, and are selectable via a tab-bar which often resides above the contents of an individual window. That is, one selected tab 114A is "forward-facing" and displays information or content to a user in the web browser 112, with the content of other tabs 114B, 114C is "hidden." The tabs 114A, 114B, and 114C may execute in separate processes, each with its own individual memory.

The client computing devices 102A, 102B, 102C may receive content from one or more server computing devices 130, 170, that may be connected to the client computing devices 102A, 102B, 102C through a network 190. Via the network 190, the computing devices 102A, 102B, 102C may communicate with the web store 130 and remote server 170. Network 190 may be any computer network including an intranet or the Internet. The web browser 112 may allow a user of computing device 102A to browse web applications 140 offered by web store server 130. Web applications 140 may be downloaded, via network 190, to client computing device 102A and installed as web applications 128.

As shown in FIG. 1, the system 100 can include a server 130 that includes one or more processors 132, one or more memories 134, an operating system 136, and one or more web applications 140. Web applications 140 may be available for download and installation via server 130, for example. Web store server 130 may be a web store that hosts the web applications 140 and makes them available to computing devices 102A, 102B, 102C. In some implementations, the web store server 130 may ensure that the web applications 140 access only allowed external libraries before making web applications 140 available for download. For example, server 130 may include one or more black lists 150, one or more white lists 152, or both. Black lists 150 indicate external libraries that are not allowed. Therefore, if a web application presented to web store server 130 accesses an external library that is identified on the black list 150, the web store server 130 may prevent the web application from being stored as web applications 140 and from being made available for download. In some implementations, web store server 130 may include a white list 152. The white list 152 identifies external libraries that are allowed. Therefore, if a web application presented to web store server 130 accesses an external library identified on the white list 152, the web store server 130 may allow the web application to be stored as web applications 140. Thus, the web store server 130 may control the types of external libraries used by the web applications 140 available from the web store.

As shown in FIG. 1, the system 100 can also include a remote server 170 that includes one or more processors 172, one or more memories 174, an operating system 176, and one or more external libraries 178. The external libraries 178 may be offered by vendors or other third parties to enhance the functionality of web applications.

As previously mentioned, a user may download an application 140 from web store server 130 and install the web application on computing device 102A. The installed version of the web application may be web application 128. Web application 128 may require access to and use of one or more external libraries 178. External libraries 178 may be hosted by a remote server 170 (or another server) and available for use by web applications 128. However, browser 112 may prevent web application 128 from executing external library 178 from server 170. Instead, browser 112 may fetch the library from server 170 when needed by the web application.

For example, when a user runs a web application 128, the web application 128 may request an external library. In some implementations the web browser 112 may intercept the request. In other implementations the web application may make a specific request to web browser 112 for the external library. In either situation, the web browser 112 may make the network request on behalf of the web application 128. This fetching path is distinct from the standard resource fetching path for packaged applications, where requests for external libraries are denied. A packaged application is an application that has any external libraries bundled with the application and installed at the time that application is installed. As part of the fetch operation the browser 112 may take advantage of locally stored copies of the library. For example, computing device 102A may store cached versions 124 of external libraries and/or bundled versions 126 of external libraries. The cached versions 124 and bundled versions 126 may be locally stored copies of external libraries 178. In some implementations, the browser 112 may determine whether a cached version 124 or a bundled version 126 of an external library exists on computing device 102A before fetching the external library 178 from server 170. Cached libraries 124 may be downloaded from remote server 170 via a web browser 112 and stored on client computing device 102A as the result of a previous fetch request for the library. Bundled libraries 126 may be installed on client computing device 102A when browser 112 is installed or when updates to browser 112 are installed. Thus, cached libraries 124 and bundled libraries 126 may be stored at computing device 102A before a web application 128 is downloaded and installed and are stored independently of web application 128. If a locally stored version of the library does not exist, browser 112 may fetch the external library 178 from server 170. In some implementations, the browser 112 may store the fetched library in cached libraries 124. Using a locally stored version of an external library allows the web application 128 to be run offline, even when the browser 112 cannot connect to server 170 via network 190.

In some implementations, the external library executed by web application 128 may communicate data to server 170 in order to provide some functionality. In such implementations, if browser 112 provided a locally stored version of the external library for web application 128 and computing device 102A is not connected to server 170 via network 190, browser 112 may store, or batch, the data until a connection becomes available. Thus, computing device 102A may include batched data 122, which is stored temporarily at computing device 102A until a connection with server 170 is established.

Figure 2:
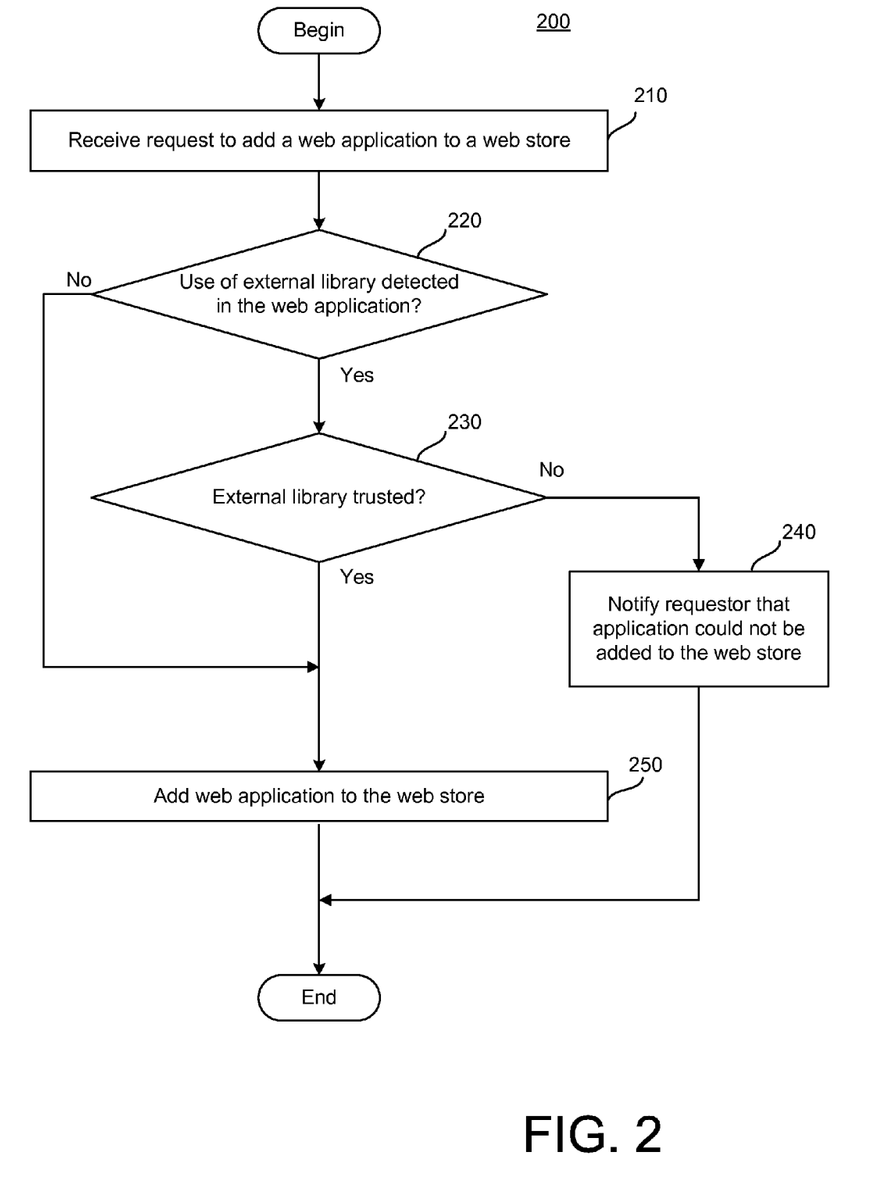
FIG. 2 is a flowchart of a process for making web applications available through a web store.

FIG. 2 is a flowchart of a process 200 for making web applications available through a web store. As discussed above, a web store or digital marketplace may offer web applications for particular browsers. Some web stores may endeavor to control the applications offered by the store and, accordingly may require inspection and approval of new web applications before the web applications are added to the web store and made available for download. Accordingly, a web store server, such as server 130 of FIG. 1, may receive a request to add a web application to the web store (210). The web application may be a hosted application or a packaged application. After receiving the request, the web store server may inspect the web application for use of external libraries, such as a JavaScript library (220). The web store server may detect such use in a variety of ways. For example, the web application may include an explicit declaration in the application manifest file. The application manifest file contains information about the web application, such as its name, version, what permissions it needs, what functions or operations it performs, etc. The manifest file may also contain an explicit statement indicating that the web application accesses a particular external library. When the web store server encounters such an explicit statement, the web store server may determine that the web application uses the external library.

In some implementations, the web store server may analyze the executable code of the web application for references to an external library. For example, the web store server may look for a statement, such as a "script" element, the creation of a "script" document object model (DOM) node, or a #include or an import statement, that identifies an external library. If no external libraries are used (220, No) then the web store server may proceed to add the web application to the web store (250), making it available for download to a client computing system. Of course, in some implementations the web store server may have other criteria to evaluate before making the web application available through the web store, but such other criteria are not shown in FIG. 2.

If the web store server finds use of an external library by the web application (220, Yes), the web store server may determine whether the external library is trusted (230). For example, the web store server may consult a whitelist to determine whether the external library is known to be trusted. If the external library appears on the whitelist then the web store server may determine that the external library is trusted. In some implementations the web store server may consult a blacklist to determine whether the external library is known to be untrustworthy. If the external library does not appear on the blacklist, the web store server may determine the external library is trusted. But if the external library appears on the blacklist, the web store server may determine the external library not trusted. If trusted (230, Yes), the web store may accept the web application and make it available to users (250). If not trusted (230, No), the web store server may block the web application from being added to the web store and may notify the requestor that the application was blocked (240). Thus, the web store server may control the external resources accessed by web applications available through the web store using process 200, providing a level of security to the customers of the web store. If the web application is a hosted application, the web store server may periodically perform process 200 after the web application has been added to the web store to detect changes in the use of external libraries. If an external library that is not trusted is found in step 230 the web store server may remove the web application from the web store so that it is no longer accessible by customers of the web store.

Figure 3:
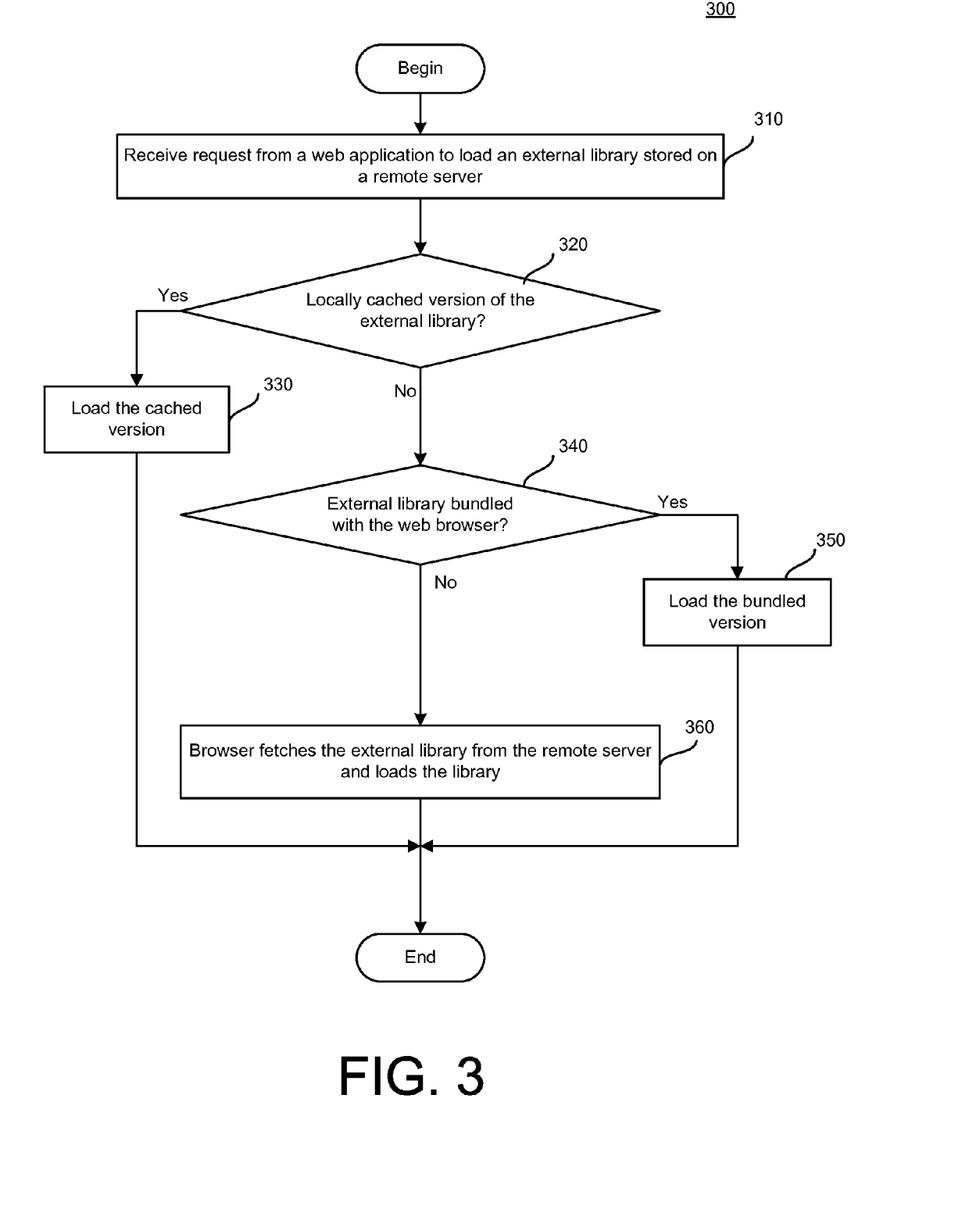
FIG. 3 is a flowchart of a process for a browser fetch of an external library.

FIG. 3 is a flowchart of an example process 300 for a browser fetch of an external library. Process 300 may be performed by a browser, such as browser 112 of FIG. 1, at the time that a web application that uses an external library runs. Process 300 may be used when the browser does not allow web applications to execute external libraries from a remote server, but the web application still utilizes the libraries.

In process 300 the browser may receive a request from a web application to load an external library stored on a remote server (310). In some implementations, the browser may intercept a load event issued by the web application. In such implementations the browser may determine whether the load event matches a pattern. For example, the browser may look for a uniform resource locator (URL) that matches a known external library, or a server hosting the external library. In some implementations the web application may include a special load request directed to the browser that specifically requests that the browser load a particular external library.

Once the browser receives the request, the browser may determine whether it has a locally cached version of the external library (320). A locally cached version may be a copy of the external library downloaded from the remote server hosting the library and stored on the computing device running the browser. For example, the locally cached version may be stored in cached libraries 124 shown in FIG. 1. The browser may create the local cache of libraries as it fetches the libraries for executing web applications. As with other cache storage, the cached libraries may be deleted after some period of time or deleted explicitly by a user command. If the browser locates the external library in the local cache (320, Yes), the browser may use the cached version. This allows the browser to provide the library to the web application faster than fetching it from the remote server and makes the library available regardless of whether the local computing device can connect and communicate with the remote server.

If no cached version exists (320, No), then the browser may determine whether a version of the library has been bundled with the browser (340). A bundled version may be a version provided with the files used to install the browser. For example, some commonly used JavaScript libraries may be included with the files installed when the browser is installed or included with a browser update. Such bundled external libraries may be locally stored, for example, in bundled libraries 126 shown in FIG. 1. Bundled libraries may be stored locally but, unlike cached libraries, bundled libraries may not be deleted after a certain amount of time. If the browser locates the external library in the bundled libraries (340, Yes), then the browser may use the bundled version (350). As with a cached version, a bundled version allows the web application to use the library without a connection to the remote server.

If neither a cached version nor a bundled version exists, the browser may fetch the external library from the remote server (360). As explained above, the fetch is performed under control of the browser, not the web application. In some implementations the browser may store the fetched version in cache for later use, for example the next time the web application is executed. Once the browser has provided the external library to the web application, process 300 ends. In some implementations, before fetching the library from the remote server the web browser may consult the black list or white list of external libraries to determine whether the library is still trusted. The web browser may do this via a web store server, such as web store server 130 shown in FIG. 1. If the library is no longer trusted, the browser may prevent the web application from using the external library.

When external libraries are bundled with the web application, updates to the library must be pushed to each installed web application. One advantage of having the browser fetch and load the external library is that updates to the library can be pushed to the browser and need not be pushed to each web application that bundles the library. For example, an update to a library may be pushed to the browser when the browser automatically looks for and applies software updates. In such an example, the third party supplying the library may work with the browser vendors to push the updates to local computing devices. Because the number of browsers is limited, this is not burdensome. Furthermore, some browsers perform such updates automatically, so the user of the computing device need not be aware of the update. Such an update model offers a faster and more complete update flow than attempting to push updates to each web application that uses the library.

Figure 4:
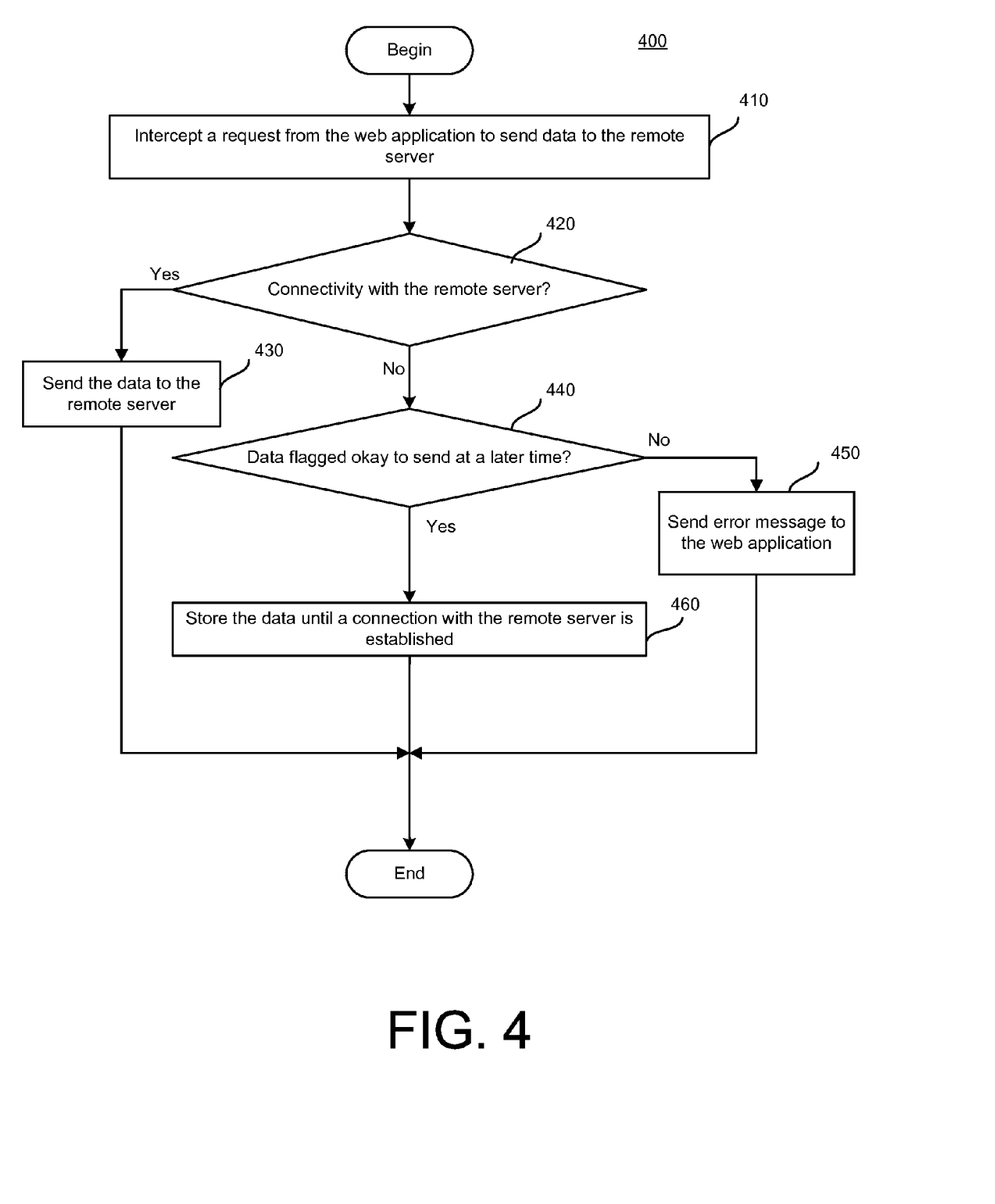
FIG. 4 is a flowchart of a process for handling data directed to a remote server as a result of running an external library.

FIG. 4 is a flowchart of a process 400 for handling data directed to a remote server as a result of running an external library. External libraries sometimes send data to a remote server to facilitate certain library-related functions. For example, a web analytics library may send data indicating a drop-off rate for transactions, data indicating that a user loaded a site as a result of clicking on a particular ad, etc. When a locally stored version of the external library allows the web application to run without a network connection, this data may be lost. However, some implementations may enable the browser to observe and control data communications between the library and the remote server. Thus, process 400 may be performed at least in part by a browser running on a client computing device (e.g., browser 112 running on computing device 102A shown in FIG. 1).

In process 400 the browser may intercept a request from the running web application to send data to the remote server (410). The remote server may be the server that hosts the external library, such as server 170 shown in FIG. 1. The browser may intercept the requests to ensure that the browser has control of communications between the computing device and remote servers. The browser may then determine whether the computing device has connectivity with the remote server (420). For example, the browser may determine whether an Internet connection exists between the computing device and the remote server. If connectivity exists (420, Yes), then the browser may send the data to the remote server (430) and the browser may complete process 400.

But when connectivity does not exist (420, No), the browser may determine whether the data is flagged as okay to send at a later time (440). For example, some data is time sensitive and cannot wait until a later time or would be useless if sent at a later time. Such data may include data that necessitates a response, such as a financial transaction that requires acknowledgement, data that may cause a conflict if applied later, such as changes to a document stored on a remote server, etc. On the other hand, some data may be gathered for statistical analysis and can be uploaded to the remote server at any time. The web application or external library may flag data that can be batched for later transmission to the remote server. The browser may look for this flag to determine whether the data can be sent at a later time. If the data cannot wait (440, No), the browser may communicate an error message to the web application (450) so that the web application knows that the data transfer could not be completed. If the data is flagged as permissible to send at a later time (440, Yes) then the browser may store the data locally until establishing a connection with the remote server (460). In some implementations the data may be batched with other data destined for the remote server.

The process shown in FIGS. 2-4 are examples of one implementation, and may have steps deleted, reordered, or modified. For example, 320 and 340 may be combined, reordered, or the browser may not perform one of the steps. As another example, the process 300 may also include determining whether a load event matches a pattern (e.g., a URL of the external library), and process 200 may include gathering and analyzing information in addition to whitelist and/or blacklist data to determine whether an external library is trusted.

Figure 5:
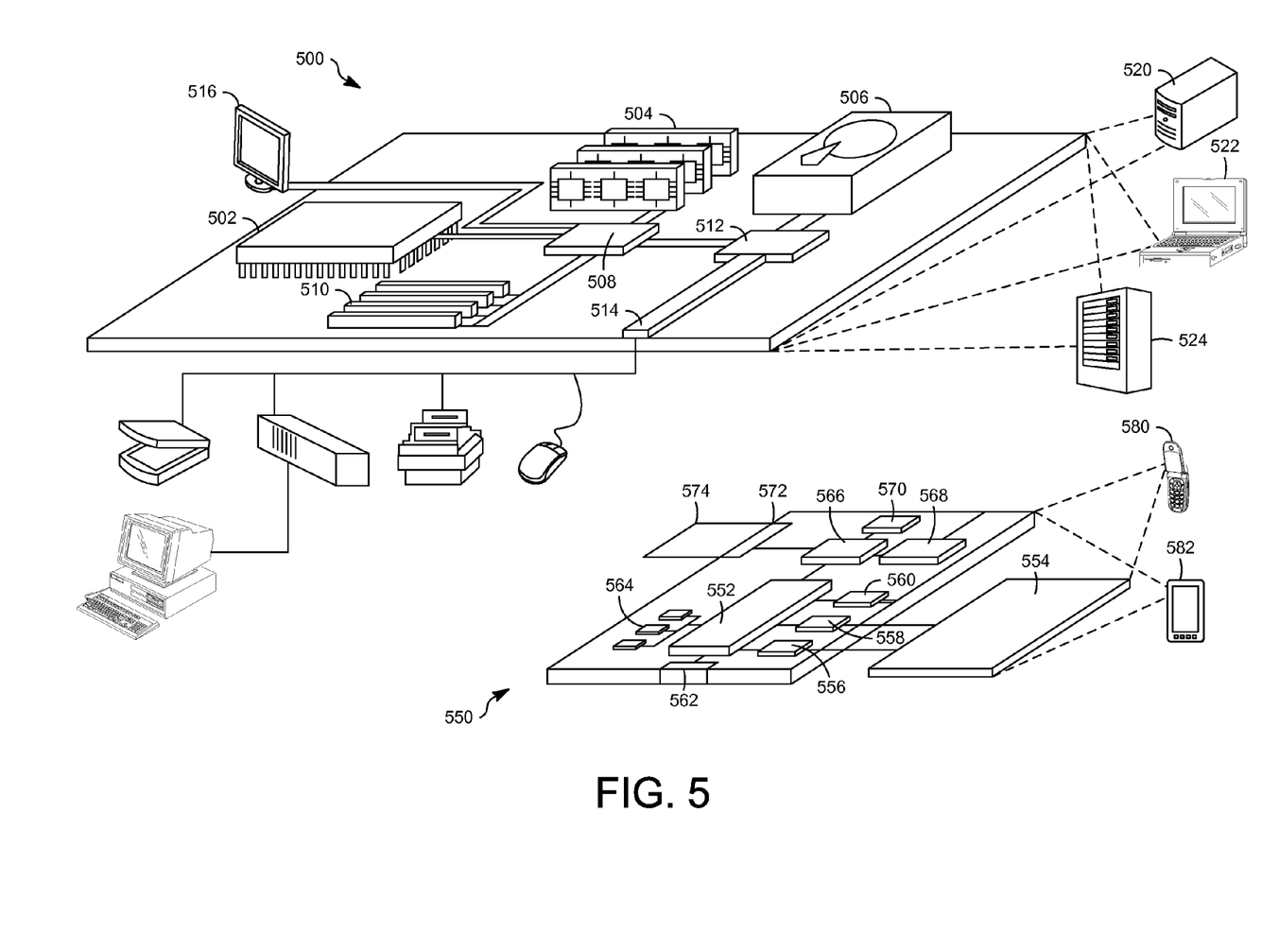
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, televisions with at least one processor, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 550. It may also be implemented as part of a smart phone 552, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    inspecting, using at least one processor, a web application for requests to use external libraries;
    determining, using the at least one processor, whether an identified external library is trusted;
    preventing the web application from being available through a web store when the identified external library is not trusted; and
    allowing the web application to be available through the web store when the identified external library is trusted.

2. The method of claim 1, wherein determining whether the identified external library is trusted includes determining whether the identified external library is on a whitelist or a blacklist.

3. The method of claim 1, wherein inspecting the web application for requests includes:
    inspecting a manifest file associated with the web application; and
    determining whether the manifest file includes an explicit declaration identifying the external library.

4. The method of claim 1, wherein inspecting the web application for requests includes:
    analyzing executable code of the web application for creation of a script document object model node.

5. The method of claim 1, wherein inspecting the web application for requests includes:
    analyzing executable code of the web application for an import statement or include statement that identifies an external library.

6. The method of claim 1, wherein the web application is a hosted web application and inspecting the web application occurs periodically and preventing the web application from being available through the web store includes removing the application from the web store.

7. The method of claim 1, wherein the web application is a new web application and inspecting the web application occurs responsive to a request to add the new application to the web store.

8. A system comprising:
    at least one processor; and
    memory storing:
        a web store storing web applications, and
        instructions that, when executed by the at least one processor, cause the system to perform operations including:
            inspecting a web application for requests to use external libraries,
            determining whether an identified external library is trusted,
            preventing the web application from being added to a web store when the identified external library is not trusted, and
            allowing the web application to be added to the web store when the identified external library is trusted.

9. The system of claim 8, wherein determining whether the identified external library is trusted includes determining whether the identified external library is on a whitelist or a blacklist.

10. The system of claim 8, wherein inspecting the web application for requests includes:
    inspecting a manifest file associated with the web application; and
    determining whether the manifest file includes an explicit declaration identifying the external library.

11. The system of claim 8, wherein inspecting the web application for requests includes:
    analyzing executable code of the web application for creation of a script document object model node.

12. The system of claim 8, wherein inspecting the web application for requests includes:
    analyzing executable code of the web application for an import statement or include statement that identifies an external library.

13. The system of claim 8, wherein the web application is a hosted web application and inspecting the web application occurs periodically and preventing the web application from being available through the web store includes removing the application from the web store.

14. The system of claim 8, wherein the web application is a new web application and inspecting the web application occurs responsive to a request to add the new application to the web store.

15. A non-transitory computer-readable medium containing instructions that, when executed by at least one processor, cause the processor to:
    inspect a web application for requests to use external libraries;
    determine whether an identified external library is trusted;
    prevent the web application from being available through a web store when the identified external library is not trusted; and
    allow the web application to be available through the web store when the identified external library is trusted.

16. The non-transitory computer-readable medium of claim 15, wherein determining whether the identified external library is trusted includes determining whether the identified external library is on a whitelist or a blacklist.

17. The non-transitory computer-readable medium of claim 15, wherein inspecting the web application for requests includes:
    inspecting a manifest file associated with the web application; and
    determining whether the manifest file includes an explicit declaration identifying the external library.

18. The non-transitory computer-readable medium of claim 15, wherein inspecting the web application for requests includes:
    analyzing executable code of the web application for creation of a script document object model node.

19. The non-transitory computer-readable medium of claim 15, wherein inspecting the web application for requests includes:
    analyzing executable code of the web application for an import statement or include statement that identifies an external library.

20. The non-transitory computer-readable medium of claim 15, wherein the web application is a hosted web application and inspecting the web application occurs periodically and preventing the web application from being available through the web store includes removing the application from the web store.

* * * * *

UNITED STATES PATENT AND TRADEMARK OFFICE
CERTIFICATE OF CORRECTION

| | | |
|---|---|---|
| PATENT NO. | : 9,325,717 B1 | Page 1 of 1 |
| APPLICATION NO. | : 14/856815 | |
| DATED | : April 26, 2016 | |
| INVENTOR(S) | : Bryan Russell Yeung et al. | |

It is certified that error appears in the above-identified patent and that said Letters Patent is hereby corrected as shown below:

In the specification,

In column 1, line 7, delete "30," and insert --3,--, therefor.

Signed and Sealed this
Twenty-eighth Day of June, 2016

Michelle K. Lee
*Director of the United States Patent and Trademark Office*